United States Patent
Arp et al.

[19]

[11] Patent Number: 5,925,120
[45] Date of Patent: Jul. 20, 1999

[54] SELF-CONTAINED HIGH SPEED REPEATER/LUN CONVERTER WHICH CONTROLS ALL SCSI OPERATIONS BETWEEN THE HOST SCSI BUS AND LOCAL SCSI BUS

[75] Inventors: Ronald Arp, Greeley; James McCarthy, Fort Collins; Curtis C. Ballard, Eaton, all of Colo.

[73] Assignee: Hewlett-Packard Company, Palo Alto, Calif.

[21] Appl. No.: 08/666,796

[22] Filed: Jun. 18, 1996

[51] Int. Cl.$^6$ ..................................................... G06F 13/00
[52] U.S. Cl. ........................ 710/131; 710/128; 710/129; 710/38
[58] Field of Search ..................................... 395/308, 306, 395/309, 281, 438, 439, 822, 851, 858, 728, 311, 312, 284, 290, 292

[56] References Cited

U.S. PATENT DOCUMENTS

| | | | |
|---|---|---|---|
| 5,206,946 | 4/1993 | Brunk | 395/500 |
| 5,233,692 | 8/1993 | Gajjar et al. | 395/309 |
| 5,239,632 | 8/1993 | Larner | 395/309 |
| 5,257,393 | 10/1993 | Miller | 395/800.01 |
| 5,289,589 | 2/1994 | Bingham et al. | 711/1 |
| 5,414,818 | 5/1995 | Henson et al. | 395/309 |
| 5,454,083 | 9/1995 | Choi | 395/285 |
| 5,598,538 | 1/1997 | Cooper | 395/281 |
| 5,606,673 | 2/1997 | Chounan | 395/309 |
| 5,615,345 | 3/1997 | Wanger | 395/309 |
| 5,664,221 | 9/1997 | Amberg et al. | 395/829 |
| 5,684,966 | 11/1997 | Gafford et al. | 395/309 |
| 5,699,533 | 12/1997 | Sakai | 395/311 |
| 5,715,406 | 2/1998 | Henson et al. | 395/287 |
| 5,781,803 | 7/1998 | Krakirian | 395/894 |
| 5,790,795 | 8/1998 | Hough | 395/200.49 |
| 5,802,327 | 9/1998 | Hawley et al. | 395/281 |

FOREIGN PATENT DOCUMENTS

| | | | |
|---|---|---|---|
| 0520838A2 | 6/1992 | European Pat. Off. | G06F 13/40 |
| 0575042A1 | 5/1993 | European Pat. Off. | G06F 13/40 |
| 0715262A1 | 12/1994 | European Pat. Off. | G06F 13/40 |

*Primary Examiner*—Ayaz R. Sheikh
*Assistant Examiner*—Raymond N Phan
*Attorney, Agent, or Firm*—Cynthia S. Deal

[57] ABSTRACT

A system and method is provided in a self-contained high speed repeater/LUN converter that allows for up to fifty-six devices to be connected to a narrow host SCSI bus via a local SCSI bus, where there does not have to be any modification of the devices on the local SCSI bus in terms of the SCSI interface. The host side of the converter supports either a single-ended or a differential SCSI bus. The converter controls all SCSI operations between the host SCSI bus and the local SCSI bus by means of a Corona device and a controller, where Corona controls all of the physical SCSI signals and the controller provides the capability to detect and respond to SCSI error conditions. The controller also selects the operation mode (LUN or repeater), board addresses, host bus type (single-ended or differential) selection, LUN/SCSI address mapping, and data mode (asynchronous, synchronous or fast synchronous) conversion.

19 Claims, 10 Drawing Sheets

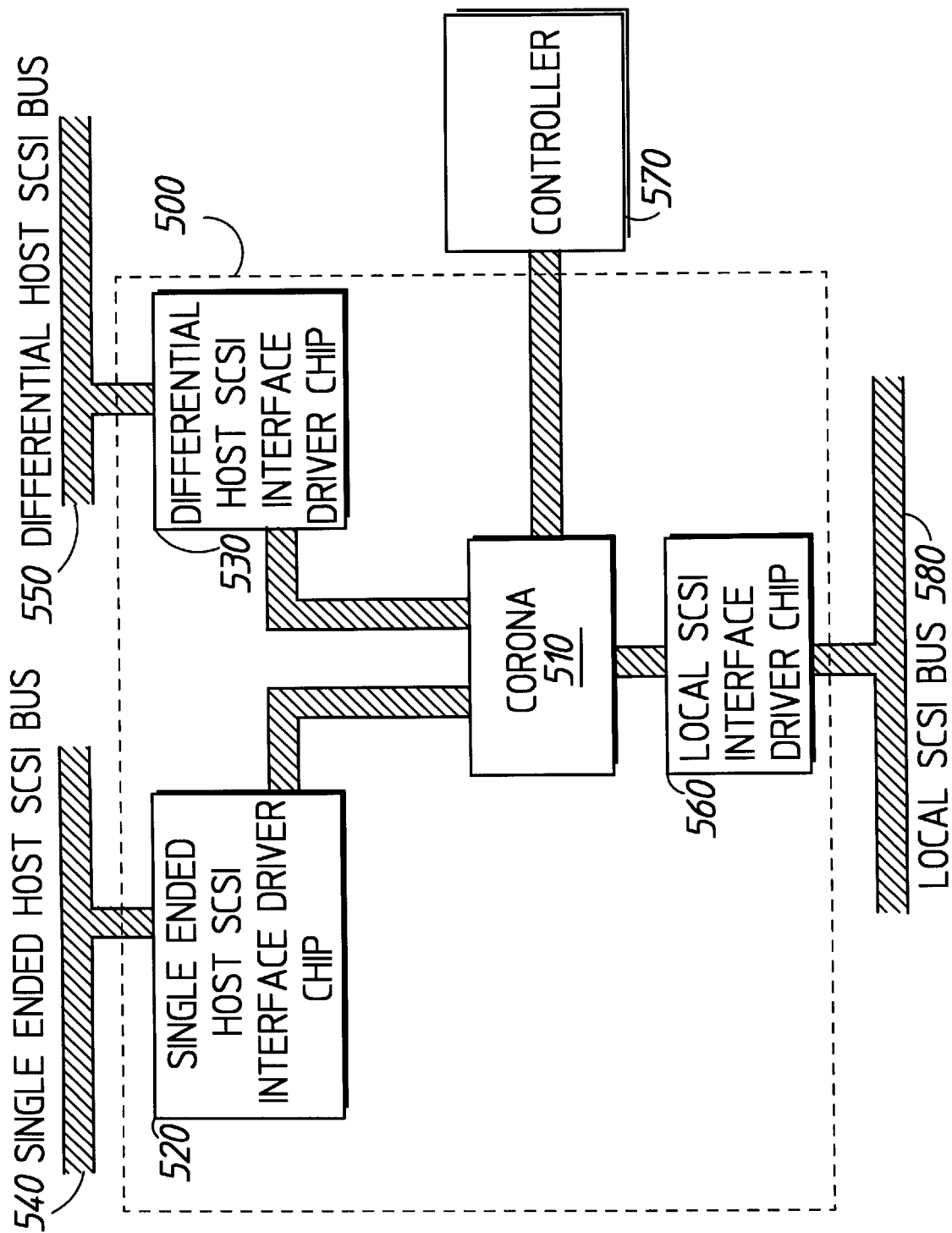

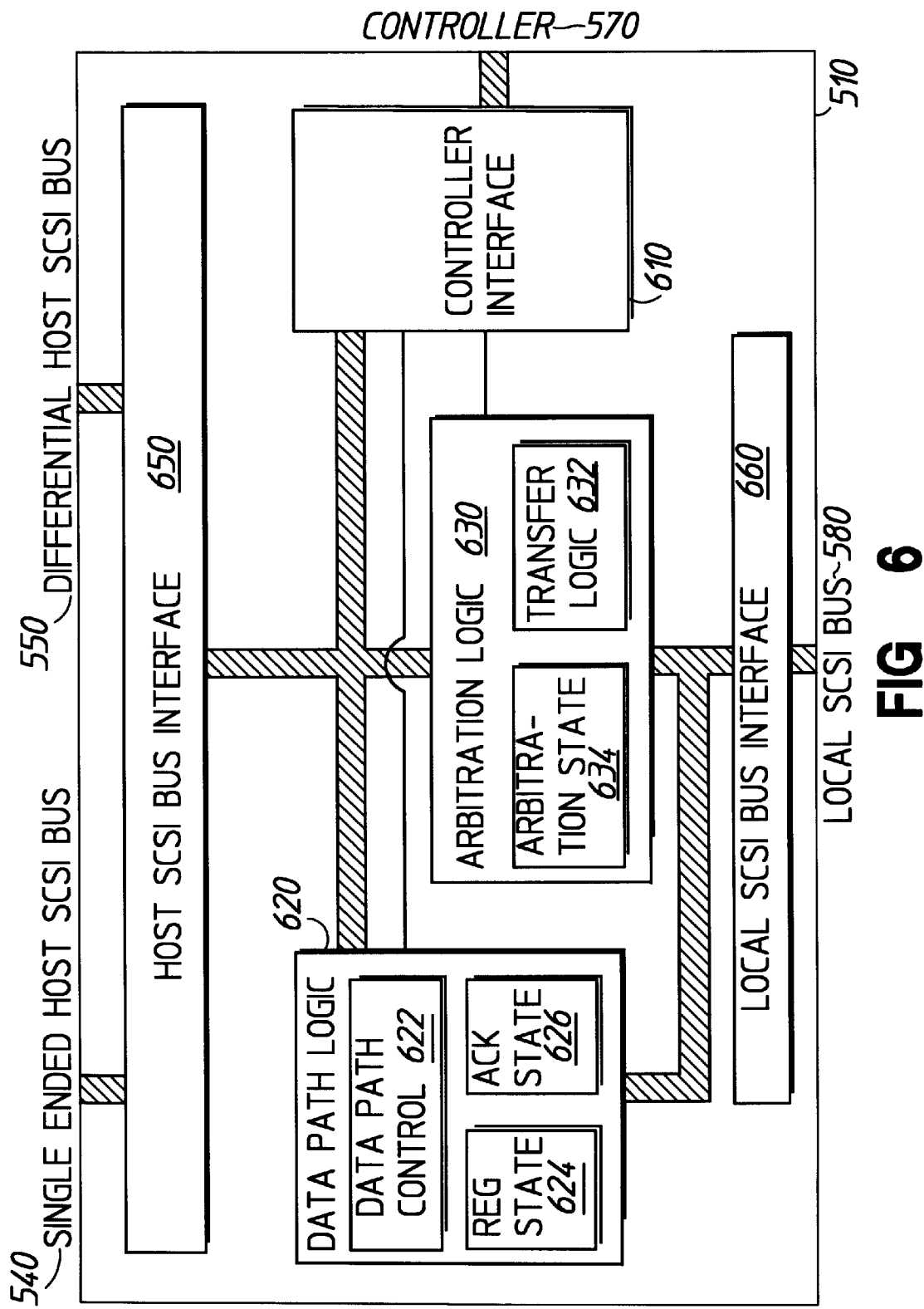

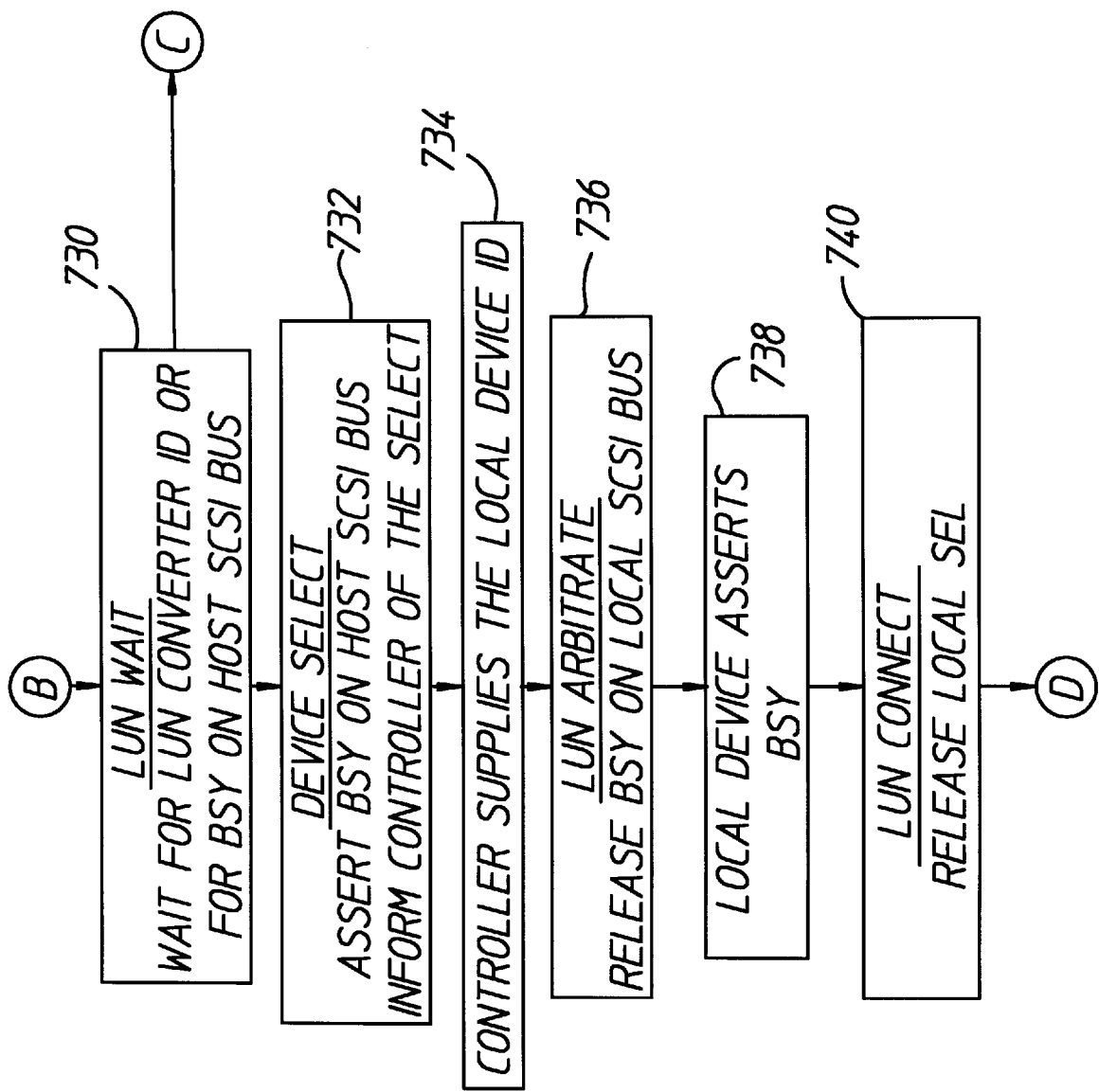

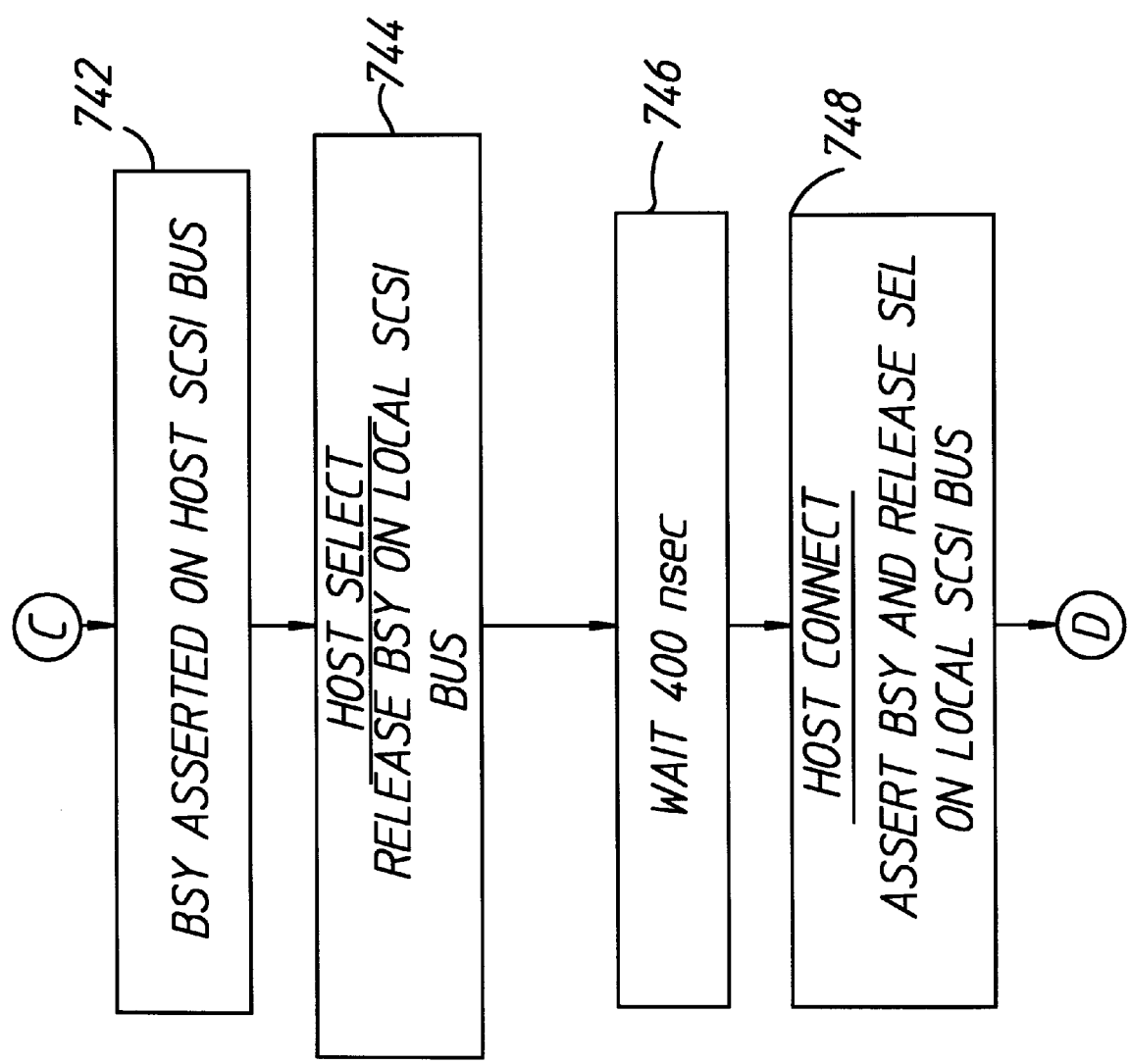

SELF-CONTAINED HIGH SPEED REPEATER/LUN CONVERTER WHICH CONTROLS ALL SCSI OPERATIONS BETWEEN THE HOST SCSI BUS AND LOCAL SCSI BUS

FIELD OF THE INVENTION

The present invention relates generally to the field of SCSI buses, and more particularly to devices and methods for effectively connecting additional devices to a SCSI bus, which exceed the maximum number of eight as specified by the identification (ID) number.

BACKGROUND OF THE INVENTION

The small computer systems interface (SCSI) is defined by the American National Standard Information (ANSI) committee as a standard communications bus that includes specifications for electrical, mechanical and logical interfaces. SCSI provides for one SCSI address per device per data line on the bus. Accordingly, narrow SCSI provides for the connection of up to eight devices on the bus, each having a unique identification number (ID) or address from zero to seven. Therefore, a typical SCSI bus with one ID reserved for the host computer can support up to seven additional devices. These devices can be of any type, such as but not limited to disk drives, tape drives, optical storage devices, printers, scanners, etc.

ANSI document numbers X3.131-1986 and X3T9.2 (Global Engineering Documents, Irvine, Calif.) describe the electrical, mechanical and logical protocol specifications for SCSI related to this invention. These documents are incorporated herein by reference.

SCSI has become an industry standard for interfaces found on most higher end personal computers and workstations. It has become the standard for peripherals, such as disk drives, tape drives, optical storage devices, printers, scanners, etc. Like all standards, SCSI is used in a large number of installed pieces of computer equipment, which has resulted in a wide variety of SCSI products. Users have invested considerable money in computers and peripherals which employ the SCSI standard. However, developers of SCSI products are reaching the limits of the SCSI bus capabilities.

With the constant increase in the performance/price ratio of computer systems, the amount of data and the number of peripherals that need to be accommodated by the SCSI bus has increased. The problem with this increase is that normal 8 bit SCSI, without the use of LUN's, can only accommodate eight devices. There are many applications where more than eight devices are needed or desired. To get around the limitations of SCSI, the conventional solutions have been to add a repeater for distance and to make a custom SCSI device with a number of peripherals inside of it.

FIG. 1 shows a block diagram of a conventional SCSI system. Referring now to FIG. 1, a host computer (also called an initiator) 102 has been arbitrarily assigned SCSI ID No. 7. The addresses shown are arbitrary but must be unique for each device and must be less than or equal to the number of data bits on the bus. The SCSI specifications cover 8, 16 and 32 bit buses. The examples described herein are based on the eight bit SCSI bus, but can be applied to wider SCSI buses as well.

The host computer 102 is electrically connected to a SCSI bus 104. Connected to SCSI bus 104 are seven additional devices (also called targets) 106, 108, 110, 112, 114, 116 and 118. These additional (target) devices 106–118 can be any device that complies with the SCSI standard protocol. Additional device 106 has been assigned, for example, SCSI ID No. 0. Similarly, drive 108 has been assigned SCSI ID No. 1, drive 110 has been assigned SCSI ID No. 2, robotics 112 has been assigned SCSI ID No. 3, drive 114 has been assigned SCSI ID No. 4, drive 116 has been assigned SCSI ID No. 5, and robotics 118 has been assigned SCSI ID No. 6.

As an aside, it should be noted that drive 108, drive 110, and robotics 112 are shown as residing in an optical library enclosure 120. This is merely for purposes of illustration to show that more than one device connected to a SCSI bus can reside in a single physical enclosure. This inclusion of more than one SCSI device in a single physical (mechanical) enclosure is done, for example, in connection with the storage of large amounts of data.

Another conventional concept is also illustrated in FIG. 1. The length of the SCSI bus is limited in order to achieve desired electrical performances. For example, the SCSI bus cannot be more than six meters long (3 meters for fast) when a Single Ended bus is used. When a Differential bus is used, the SCSI bus can have a maximum length of 25 meters.

There are many situations where the additional device is located more than six meters, or more than 25 meters, (depending on the communication scheme employed) from the host computer 102. This is graphically illustrated in FIG. 1. It is seen that a conventional repeater 124 connects additional device 106 via a SCSI bus 2 (assigned reference number 126) to the main SCSI bus 104. Repeater 124 provides the necessary signal buffering to allow for the additional device 106 to be physically situated more than the six meter or 25 meter limit from the host computer 102.

Repeater 124 merely acts to boost the signal strength received on one bus back to the desired signal strength for the other bus. The repeater 124 preforms this amplification in both directions depending on which direction the specific SCSI signal is headed. The repeater 124 does nothing more than buffer and amplify the SCSI bus signals so as to allow for a longer distance for the entire cable. In effect, it acts like repeaters used in many other applications such as telephones and radios in terms of merely amplifying the signal levels from one bus to a second bus. It should be noted that no signal storage or mapping or other function occurs in repeater 124. The repeater 124 does not modify or redirect the information passed through it.

As stated above, there are many situations where it is needed or desired to have more than eight devices connected to a SCSI bus.

One conventional approach for allowing for more than eight units to be effectively connected to the SCSI bus is shown in FIG. 2. The SCSI bus 104 is connected to a peripheral device 202. Peripheral device 202 is assigned a single SCSI ID number. As far as the SCSI bus 104 is concerned, peripheral device 202 has a single SCSI identification.

Peripheral device 202 includes a plurality of N drives, for example, (where N is a positive integer greater than 1). Specifically, in the examples shown, peripheral device 202 includes a drive 1 (labeled with reference number 218), a drive 2 (labeled with reference number 224), and a drive N (labeled with reference number 230). A controller 204 electrically connects the SCSI bus 104 with the drives 218, 224 and 230 using a hard-wired, (often proprietary), and dedicated approach as follows.

As shown, controller 204 includes a microprocessor 206, switching electronics 208, a stored computer program 210, and electronic storage 212 for use by the controller 204 and microprocessor 206. Together, controller 204 routes information received from the SCSI bus 104 to the specific drive 218, 224, 230 as determined by the program stored in program 210 of controller 204. This routing is accomplished using individual buses and control lines for each of the drives. For example, as shown, drive 218 is connected to the controller 204 via a bus 214. In addition, a control line 216 is included, which allows controller 204 to control the operation of drive 218. Similarly, drive 224 includes a bus 220 and a control line 222, and drive 230 includes a bus 226 and a control line 228. It can be seen that this approach requires specific buses and control lines for the controller 204 in order to effect a desired data transfer.

Controller 204 must be programmed using its stored computer program 210 so as to be able to carry out the intended functions that are needed to accommodate the SCSI bus 104. It can be appreciated that the drives 218, 224 and 230 cannot be directly connected to the SCSI bus 104. Similarly, it can be appreciated that the controller 204 is required in order to accommodate the interfacing between the SCSI bus 104 and the drives 218, 224 and 230. Typically, controller 204 is required to reformat data received from SCSI bus 104 for transmission to one or more of the drives 218, 224 and 230, and for transmission on the SCSI bus 104. Therefore, it can also be appreciated that considerable data reformatting and SCSI bus protocol accommodation must be made by the peripheral device 202. Nevertheless, peripheral device 202 provides a means to connect more than one device to SCSI bus 104 at a single address.

The SCSI standard further includes a logical unit number (LUN). A logical unit number is specified from 0 to 7. Some host computers 102 include drivers (hardware and/or software) which provide the logical unit number, whereas others have more simple drivers that do not provide the logical unit number. Modification of the host computer to include such a driver is relatively simple and inexpensive and is conventionally known.

The provision of a logical unit number by the host computer 102 on the SCSI bus 104 allows for a peripheral device 202 to specify up to eight devices contained in the peripheral device 202. In other words, the logical unit number allows the peripheral device 202 to select a desired internal device that is being specified by the SCSI bus 104. Thus, up to eight devices can be contained in a peripheral device 202 having a controller 204 which can recognize and operate using a logical unit number provided on the SCSI bus 104.

Conventional approaches required that the controller 204 recognize the logical unit number, then act to control the internal devices 218, 224 through 230, and to remap data sent to and received from devices 218, 224 through 230 via the controller 204. This typically requires that the devices 218, 224 and 230 be dedicated. It also requires considerable additional electronics to accommodate the logical unit function specified on the SCSI bus 104. Nevertheless, it can be seen that this results in a single SCSI ID number being able to accommodate up to eight internal devices as specified by the logical unit number.

It should be noted that although this solution does add devices to the SCSI bus 104 using the LUN mode and the local devices 218, 224 through 230 can be SCSI devices, this approach of using a computer system for control does not meet the timing specifications for the SCSI bus 104. The local signals do not connect directly or through a simple buffer to the host SCSI bus 104. The controller 204 must receive and then retransmit all information bytes between the SCSI bus 104 and the local devices 218, 224 through 230.

Conventional approaches exhibit significant deficiencies. Where the logical unit number is not used, it can be seen that the number of devices that can be accommodated on the SCSI bus 104 is a maximum of eight.

Where the logical unit number is employed, it can be seen that the maximum number of logical unit numbers of devices that can be accommodated on the SCSI bus 104 is fifty-six (7 SCSI ID numbers×8 logical units, where the first SCSI ID number is assigned to the host computer 102). However, considerable electronics is required to accommodate the additional devices that are assigned to a specific SCSI ID number. In addition, these devices typically have to be dedicated, and do not use the SCSI bus interface between their controller 204 and the device 218, 224 through 230. Reformatting and control signaling is required, and existing devices merely have SCSI interfaces, but cannot be connected to the controller 204 or used in such a configuration.

U.S. Pat. No. 5,239,632 entitled "DEVICE TO TRANSLATE LOGICAL UNIT NUMBER COMMUNICATIONS ON ONE SCSI BUS TO ID COMMUNICATIONS ON A SUBORDINATE SCSI BUS", incorporated herein by reference, solved many of the problems of the prior art by use of a SCSI LUN converter utilizing state machines and transfer gates to bridge between a main SCSI bus and a subordinate SCSI bus supporting additional devices, as shown in FIGS. 3 and 4.

Referring now to FIG. 3, host computer 102 provides SCSI ID numbers and logic unit numbers in accordance with SCSI protocol. Host computer 102 is assigned SCSI ID number 7. It should be noted that the host computer 102 must include a driver which can provide the logic unit numbers (LUN). Host computer 102 can be any computer system using a SCSI bus. Host computer 102 is connected to the SCSI bus 104, labeled "master" SCSI bus. Connected to master SCSI bus 104 are additional devices 106, 108, 110, 112 and 114. These additional devices are assigned master SCSI ID numbers 0, 1, 2, 3 and 4, respectively.

Master SCSI ID number 6 is connected to the master SCSI bus 104 by a device called a Minnow 304. Minnow 304 is assigned master SCSI ID number 6. Minnow 304 is associated with the eight additional devices that are associated with master SCSI ID number 6. This association is indicated by the dashed-line box 302. It should be noted that the additional devices associated with master SCSI ID number 6 do not have to be physically located in the same mechanical enclosure, or at the same location, but merely need to be physically distant from Minnow 304 within the length (6 meters or 25 meters) of the communications approach in accordance with the SCSI protocol that is used, assuming no repeaters are associated with master SCSI ID number 6.

The eight additional devices that are associated with master SCSI ID number 6 are connected to the Minnow 304 by a "subordinate" SCSI bus 306, which utilizes the standard SCSI protocol. Thus, it can be appreciated, that the additional devices connected to the subordinate SCSI bus 306 can be ones that use the conventional SCSI protocol, and do not have to be modified or enhanced in any way.

Representative examples of additional devices that can be connected to the subordinate SCSI bus 306 are a printer 308, assigned subordinate SCSI ID number 0; a scanner 310, assigned subordinate SCSI ID number 1; a tape drive 312, assigned subordinate SCSI ID number 2; an optical storage device 314, assigned subordinate SCSI ID number 3; and a modem, assigned subordinate SCSI ID number 7.

A Minnow 304', included in the physical enclosure 320 is the same as Minnow 304, except for the fact that it responds to master SCSI ID number 5 and supports a different set of additional devices 324, 326 and 328 by means of subordinate SCSI bus 322.

Minnow 304 and Minnow 304' each map communications provided on the master SCSI bus 104 for their particular master SCSI ID number to the appropriate device on the associated subordinate SCSI bus 306 or 322, respectively using SCSI LUN numbers.

Specifically, host computer 102 provides a master SCSI ID number and a logical unit number as part of its standard SCSI protocol. The Minnow 304 responds to its master SCSI ID number 6. It maps communications to the devices connected to its subordinate SCSI bus 306 in accordance with the logical unit numbers that are supplied by the host computer 102. Only one master SCSI ID number is used for the master SCSI bus 104. However, through the use of the logical unit numbers associated with that master SCSI ID number, the Minnow 304 is able to connect up to eight additional devices to the host computer 102 through the use of its mapping function and its subordinate SCSI bus 306. None of the additional devices connected to its subordinate SCSI bus 306 have to be modified since the mapping of the logical unit numbers from the master SCSI bus 104 are converted to subordinate SCSI ID numbers for the subordinate SCSI bus 306. Thus, Minnow 304 bridges the master SCSI bus 104 with its subordinate SCSI bus 306.

There are two types of SCSI arbitrations, Select and Reselect. Select arbitrations are performed by the host computer when selecting a target device. Select arbitrations start a SCSI command. All commands are initiated by the host computer 102. Some commands can take a significant amount of time for a device to complete, in which case the target device can inform the host computer 102 that it will be busy for awhile after which the target device can put the communication on hold. During this time the host computer 102 or any other SCSI device can use the SCSI bus. Once a target device is ready to respond to the command it had previously put the host computer 102 on hold for, the target can Reselect the host computer 102 and finish the command. The signals used in arbitration are BSY, SEL, ATN, IO, and the data lines. One data line is used for each SCSI address with data line 0 being SCSI address 0, data line 1 being SCSI address 1, etc.

When a SCSI device is ready to arbitrate, it waits for the SCSI bus to be free. The bus free condition is when neither BSY and SEL is asserted. Once the bus is free, the SCSI device asserts BSY and its address on the bus. During this part of the arbitration, any other device can also assert BSY and its address. After all devices have had a chance to join in, the winning device is determined. This is based on the highest address asserted. The winning device then asserts SEL and then waits for all other devices to get off of the bus. The winning device then asserts the address of the device it wants to talk to and either ATN or IO. If the winning device is the host computer 102 performing a Select, it asserts ATN. If the winning device is a target device performing a Reselect, it asserts IO. In either case, the winning device then releases BSY. The device being Selected or Reselected by the winning device asserts BSY. For a Select operation, the winning device (host computer 102) releases SEL and the two devices enter the SCSI information transfer phase. For a Reselect operation, the winning device reasserts BSY and then releases SEL. The Reselected device (host computer 102) then releases its busy signal and the two devices enter the information transfer phase.

It should be noted that the device which started the arbitration cycle may not be the winning device. In the case of a LUN or repeater card, the device which started may be on a different bus. As a result, the direction of the BSY line may change multiple times during the initial arbitration sequence. In repeaters and LUN boards, this turning around of the BSY line causes glitches on the line because the repeater and LUN board arbitration logic has to detect and respond to the change in direction of the BSY line. It takes a small but detectable amount of time for this to occur.

There are six phases defined for SCSI information transfer; "Message In", "Message Out", "Command", "Status", "Data In", and "Data Out". The target device controls which phase the bus is in by controlling the state of the MSG, IO, and CD SCSI lines. The host computer 102 asserts the ATN line when it needs to notify the target device of something (usually some sort of error condition). A normal SCSI information transfer starts with an identify message followed by other messages and then a command, data, status, and a command complete message. As noted above, if the command cannot be done immediately, the target device may go bus free after the command only to Reselect the host computer 102 later and then finish the command.

During the message phase after the identify message and before the command phase, the target device and the host computer 102 setup data communication modes amongst other things. There are three types of SCSI communication modes: asynchronous, synchronous (200 nsec.), and fast synchronous (100 nsec.). This data communication mode setup is normally done the first time a host computer 102 and a target device communicate after a SCSI bus reset. The communication mode persists through all arbitration cycles unless renegotiated on. The communications mode only effects the data transfer phases. All other communication phases are asynchronous only.

As used herein, the Select cycle and the Reselect cycle are in accordance with those cycles as used in the SCSI protocol. There has been no modification in any way to the SCSI protocol with regard to the Select cycle or the Reselect cycle, or with respect to anything else described herein.

In the Select cycle the host computer (initiator) 102 selects the Minnow 304 by sending its master SCSI ID number out on the master SCSI bus 104. The Minnow 304 responds to its master bus SCSI ID number and retrieves the logical unit number from the "Identify Message Out" that is then sent by the host computer 102. According to SCSI protocol, this step established communication in the Select cycle between the host computer 102 and the Minnow 304. As far as the host computer 102 is concerned, the Minnow 304 that is selected using the master SCSI ID number is the target device.

The Minnow then converts the logical unit number from the "Identify Message Out" to the subordinate SCSI ID number of the specified target on the subordinate SCSI bus 306. Then the Minnow 304 communicates with the target using the subordinate SCSI ID number of the target. The target device responds. And the Minnow 304 then send the "Identify Message Out" to the target via the subordinate SCSI bus 306. This step establishes communications between the Minnow 304 and the target device as specified by the logical unit number received from the host computer 102.

In the final step of the Select cycle, the Minnow 304 connects the master SCSI bus 104 to the subordinate SCSI bus 306 so that the host computer 102 can communicate with the target device on the subordinate SCSI bus 306. This communication from the host computer 102 to the target device on subordinate SCSI bus 306 and vice versa appears to each side to be direct. In fact, transceivers are utilized in Minnow 304 so that transfer of data between the master SCSI bus 104 and the subordinate SCSI bus 306 can be accomplished.

SCSI protocol also includes a Reselect cycle, which allows a target device to work on a task and not tie up the SCSI bus while it is working on this task. In other words, the target device once assigned a task in the Select cycle, can get off the master and subordinate SCSI buses and work on the specified task. When the target device has reached the point in the specified task where it is ready to send data back out on the master and/or subordinate SCSI buses, it initiates the Reselect cycle. In this way, optimal utilization of the master and subordinate SCSI buses occurs.

In the Reselect cycle, the target device Reselects the Minnow 304 by sending its SCSI ID out on the subordinate SCSI bus 306. Minnow 304 responds to its master bus SCSI ID number and retrieves the logical unit number from the "Identify Message In" that is sent by the target. This step establishes communications in the Reselect cycle between the target device and the Minnow 304. As far as the target device is concerned, the Minnow 304 that is Reselected is the host computer 102.

In a final step of the Reselect cycle, Minnow 304 connects the master SCSI bus 104 to the subordinate SCSI bus 306 so that the host computer 102 can communicate with the target device on the subordinate SCSI bus 306. This communication from the host computer 102 to the target device on the subordinate SCSI bus 306 and vice versa appears to each side to be direct. In fact, transceivers are utilized in the Minnow 304 so that the transfer of data between the master SCSI bus 104 and the subordinate SCSI bus 306 can be accomplished.

Referring now to FIG. 4, the master SCSI bus 104 is connected to a master selection machine 402, a master reselection machine 404, and transceivers 406. Master selection machine 402 is connected to an ID switch 406, as is the master reselection machine 404. The ID switch 406 can be set by the user to specify the master SCSI ID number for the master SCSI bus 104 that the Minnow 304 is set to respond to.

Master selection machine 402 responds to the master SCSI ID number sent on the master SCSI bus 104, and then retrieves the logical unit number from the "Identify Message Out" received from the master SCSI bus 104. The master selection machine 402 converts the logical unit number to the subordinate SCSI ID number of the specified target device on the subordinate SCSI bus 306. This subordinate SCSI ID number is supplied via a line 408 to a subordinate selection machine 410.

The subordinate selection machine 410 is connected to the subordinate SCSI bus 306. Similarly, a subordinate reselection machine 440 is connected to the subordinate SCSI bus 306. In addition, the transceivers 406 are connected to the subordinate SCSI bus 306.

A main control machine 412 communicates master selection machine control signals 414 to/from the master selection machine 402, communicates master reselection machine control signals 416 to/from the master reselection machine 404, communicates transceiver control signals 418 to/from the transceivers 406, communicates subordinate selection machine control signals 420 to/from the subordinate selection machine 410, and communicates subordinate reselection machine control signals 422 to/from the subordinate reselection machine 440. The main control machine 412 acts to control the operation of the five devices (state machines 402, 404, 410, 440 and transceivers 406) that it is connected to in Minnow 304. Control is in accordance with the Selection and Reselection cycles as discussed above.

The subordinate selection machine 410 communicates with the target via the subordinate SCSI bus 306. The target is identified by the subordinate SCSI ID number received on line 408. It is the subordinate selection machine 410 that sends the "Identify Message Out" to the target on the subordinate SCSI bus 306.

Thereafter, the main control state machine 412 communicates with the transceivers 406 so that proper transfer of data on master SCSI bus 104 and data on subordinate SCSI bus 306 takes place so that the host computer and the target device believe that they are in direct communications with each other.

In the Reselection cycle, the subordinate reselection machine 440 respond to the Reselection and "Identify Message In" received from the target device on the subordinate SCSI bus 306. The subordinate reselection machine 440 responds and retrieves the subordinate bus SCSI ID number from the "Identify Message In".

The subordinate reselection machine 440 converts the subordinate bus SCSI ID number to the logical unit number, which is also called the LUN info. The logical unit number (LUN Info) is provided via a line 424 to the master reselection machine 404.

The master reselection machine 404 reselects the host computer 102 on the master SCSI bus 104. Under control of the main control state machine 412, it reselects the host computer 102 then handshakes the "Identify Message In" to the host computer 102 connected to the master SCSI bus 104.

Thereafter, the main control machine 412 via transceiver control signal 418 uses the transceivers 406 to properly transfer data on the subordinate SCSI bus 306 to the master SCSI bus 104 and vice versa. In this way, the target and the initiator believe that they are in direct communications with each other.

Although this LUN converter solution does meet the specifications for the SCSI bus timing and connects the local target devices "directly" with the master SCSI bus 104 with the use of buffers used as switches to connect and disconnect signals, it is deficient in several critical areas. First, this solution does not address error conditions on the bus, such as when the host computer 102 tries to use a SCSI message which is not supported by LUN converter. There are many messages defined in SCSI, not all of which apply to all SCSI devices. Also, it is not mandatory for all SCSI devices to accept all SCSI messages. If the host computer 102 uses one of the messages that is not supported with the LUN converter, the LUN converter must be able to give the correct response back to the host computer 102. This LUN converter solution also does not handle communications from the host computer 102 directed at the LUN converter itself instead of a local target device such as device reset messages without the identify which imply resetting all LUN's within the target.

Second, there is no means provided in this solution to inform the host computer 102 that the requested target device is not available, which can cause the system to fail. The host computer 102 generally cannot tell which LUN's are valid without requesting the LUN in SCSI. The LUN card must establish communications with the host computer 102 before it can find out which LUN is being requested. If the host computer 102 requests an invalid LUN, the LUN converter must be able to give the correct response back to the host computer 102. Otherwise, the SCSI bus would fail and the system would stop running (system hang), which is what happens with this system.

Another area that this solution is deficient in is the actual data transfer operation after the target device has been selected. Specifically, SCSI allows for three modes of data transfer: asynchronous, synchronous and fast synchronous. These modes are not directly interchangeable. The solution of U.S. Pat No. 5,239,632 does not provide for the different communication modes. Accordingly, if the host computer 102 tries to communicate with a target device in asynchronous mode and the target device only communicates in synchronous mode, the system will fail, which means the computer system would hang or even worse, the data being transferred on SCSI could be changed randomly. Depending on what information was being transferred, this error could damage critical data.

Still further, implementations of this solution have problems with glitches on either the master or subordinate SCSI bus during arbitration. Basically, arbitration is when the host computer and local target devices decide who is going to use the bus. The SCSI bus arbitration sequence is an involved process and the complexity of multiple state machines used in this solution make it difficult to prevent glitches on either SCSI bus, which can cause the computer system to be unable to access a device and possibly hang.

SUMMARY OF THE INVENTION

It is an aspect of the present invention to provide a self-contained high speed repeater/LUN converter that overcomes the deficiencies of the prior art SCSI systems. Specifically, the present invention has host side SCSI ports for connecting to the host computer bus and a device side SCSI port for connecting to the local devices. The host side of the converter has both single ended and differential SCSI ports to connect to either type of SCSI bus. All basic SCSI operations are performed in dedicated logic such as a field programmable gate array or other ASIC design referred to as Corona. Corona operates the SCSI bus and is connected to a controller.

The controller can be another ASIC with memory or a small microcontroller/microprocessor. It's responsibilities include power on self test, Corona configuration and control, SCSI host bus type selection and monitoring, LUN Select and Reselect processing, SCSI message processing, SCSI error handling. Information needed by the controller can be supplied through any number of standard means such as an EEPROM, a parallel port, switches, or even a jumper bay.

In operation, the system is turned on and the controller is supplied with the desired configuration information. The controller configures Corona for the desired mode. Corona monitors the SCSI bus for arbitrations supplying the information to the local bus. In the repeater mode, Corona just passes the information through between the local and host buses. In the LUN mode, if a host device Selects Corona's SCSI address, Corona halts arbitration on the local bus at the assertion of both BSY and SEL and finishes the arbitration with the host bus. Corona waits for the controller to get the identify message from the host and to decode the LUN number to a local SCSI address.

When the controller supplies the local SCSI address to Corona, Corona completes arbitration with the local device. The controller then sends the local device the identify message minus the LUN number and sets up Corona for the previously agreed to data transfer mode. The default mode is asynchronous as specified in the SCSI specifications. Once the controller is done, Corona allows the local device and the host to communicate. During regular communications, any messages are monitored for data mode agreements by the controller. When a new agreement is reached, the controller reconfigures the Corona data path logic per the new agreement. Once the communications are complete and the SCSI buses are free, Corona prepares itself for the next SCSI bus cycle.

BRIEF DESCRIPTION OF THE DRAWINGS

The above and other objects, features and advantages of the present invention will be better understood by reading the following more particular description of the invention, presented in conjunction with the following drawings, wherein:

FIG. 5 shows a high level block diagram of the architecture of the present invention;

FIG. 6 shows a detailed block diagram of the architecture of the present invention;

FIGS. 7A–C show a flow chart illustrating the operation of the present invention.

DETAILED DESCRIPTION OF THE PREFERRED EMBODIMENT

Figure 1:
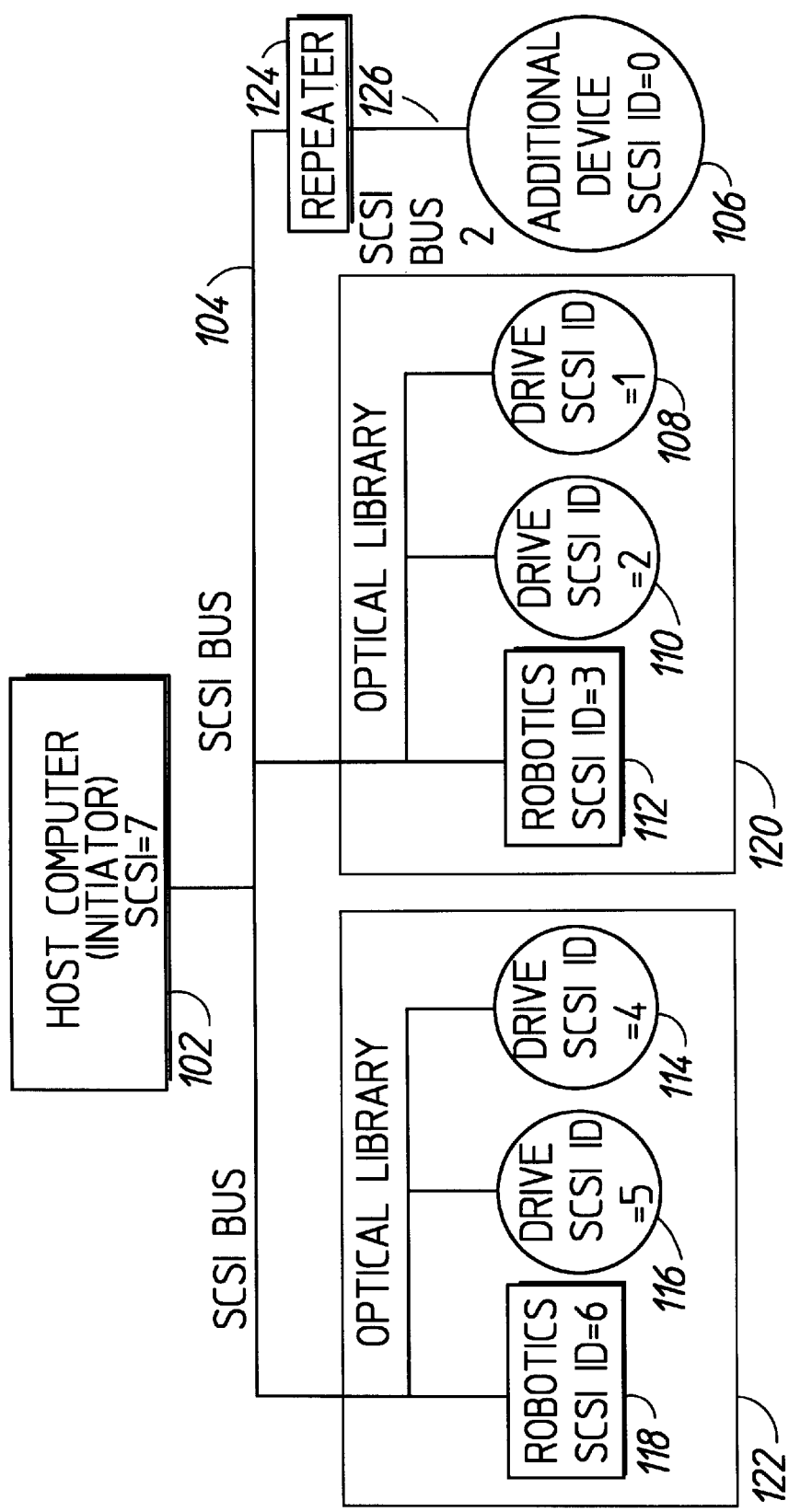
FIG. 1 shows a block diagram of a conventional system having seven devices connected to a host computer on a SCSI bus, and including a repeater with one of the additional devices for allowing an increased distance between the additional device and the host computer.
Figure 2:
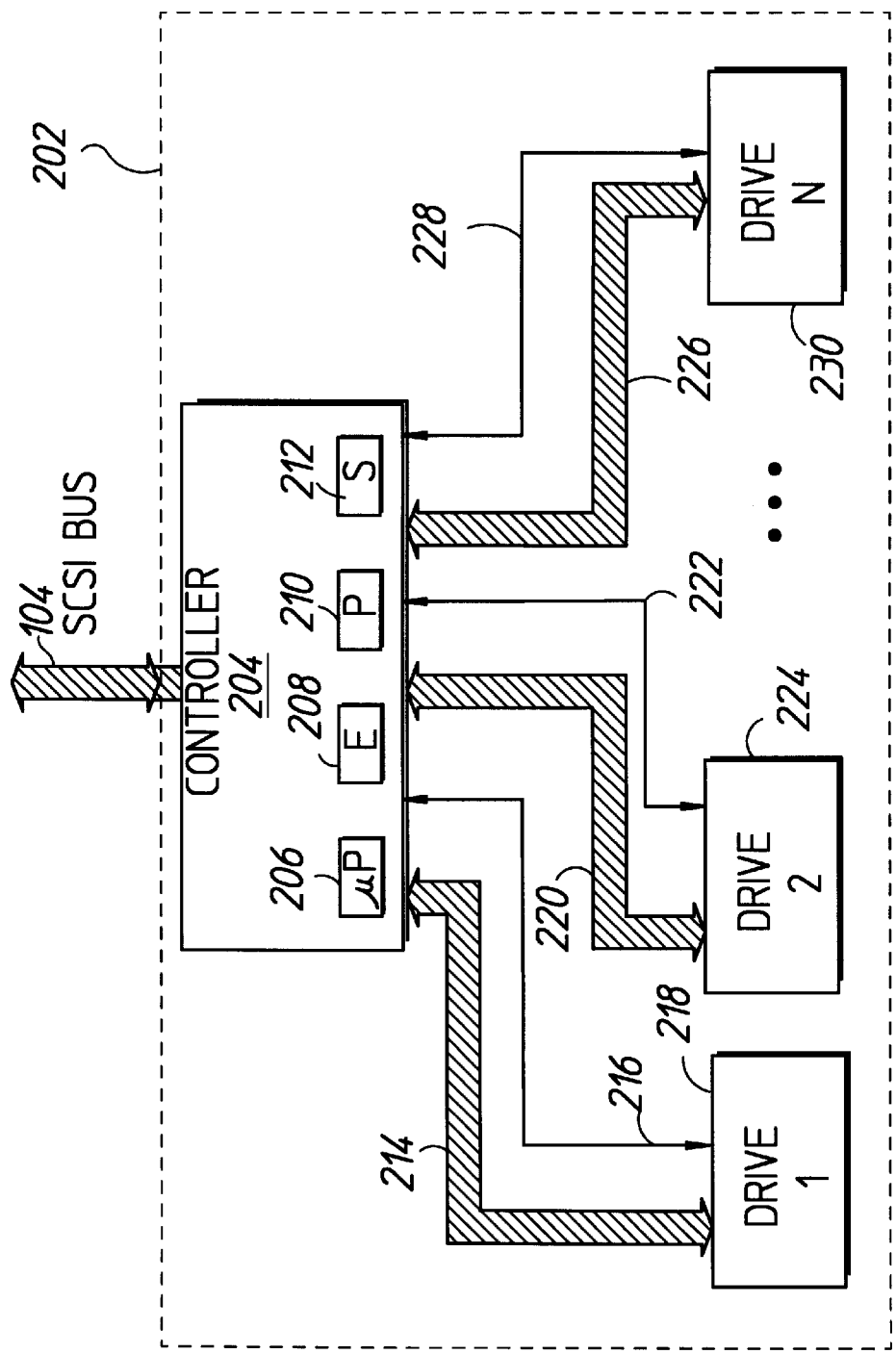
FIG. 2 shows a conventional peripheral device architecture having several internal devices connected to the SCSI bus via a controller.
Figure 3:
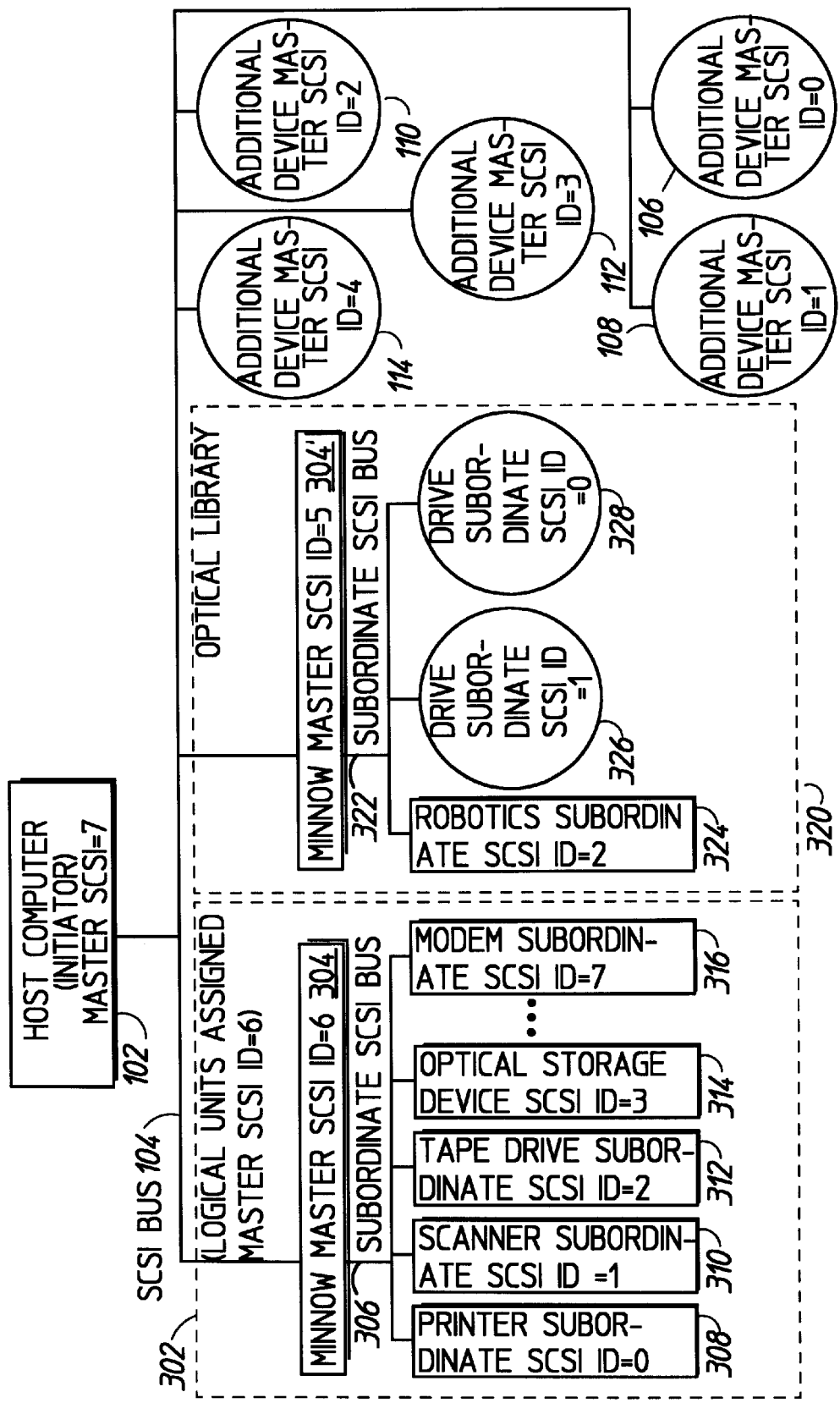
FIG. 3 shows a block diagram at a high level of a prior art system having several devices connected to a host computer on a master SCSI bus, and including additional devices connected to the master SCSI bus by means of a subordinate SCSI bus and a Minnow.
Figure 4:
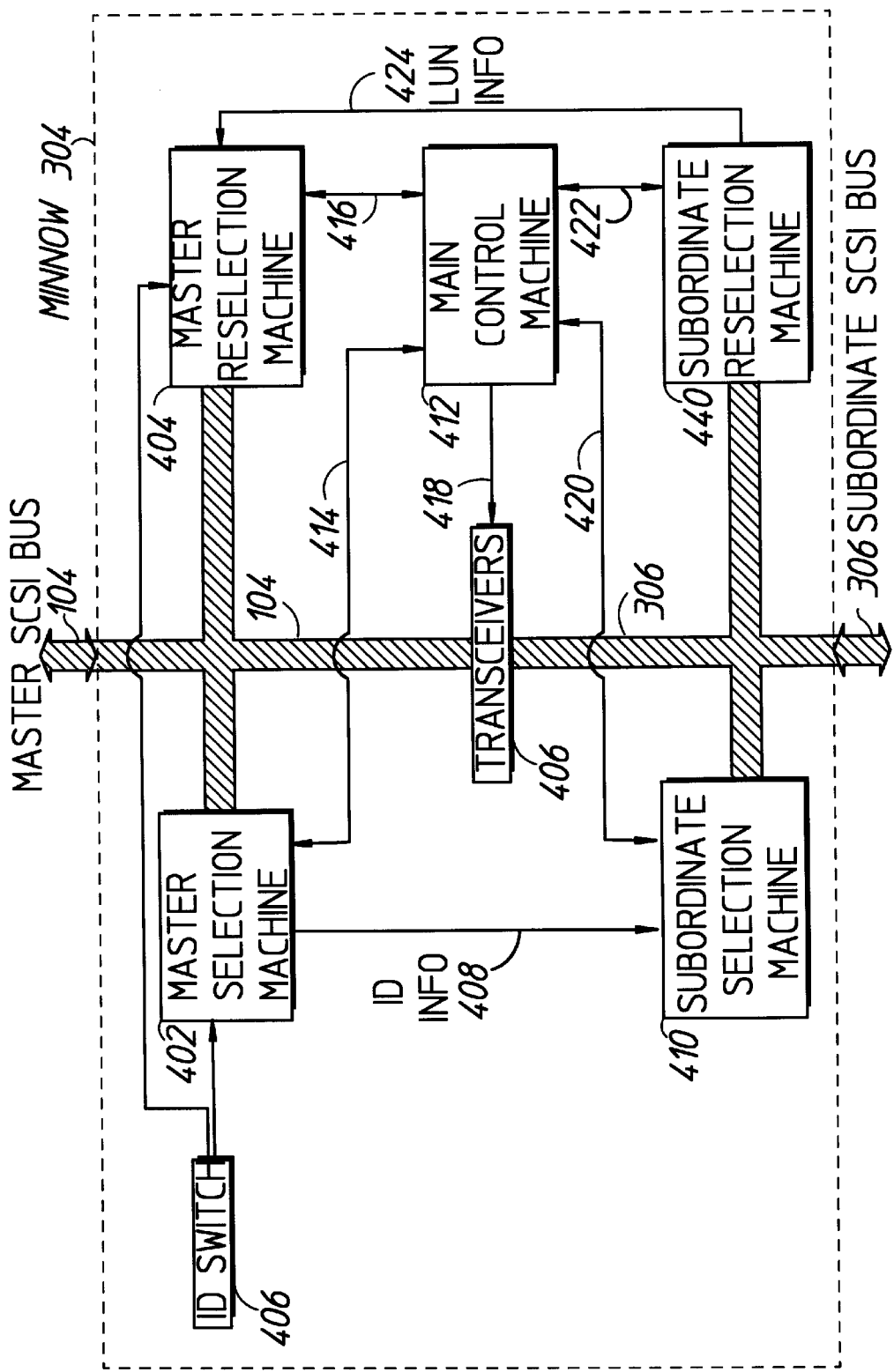
FIG. 4 shows a block diagram of the internal architecture of the prior art Minnow system design of FIG. 3.

The present invention allows for up to fifty-six devices to be connected to the narrow SCSI bus, where each local target device can employ the SCSI interface and does not have to be modified in any way. Any host device can access any local device by using the SCSI ID number and logical unit number assigned to that device, and the local devices can access the host devices in a similar fashion in accordance with the standard SCSI protocol. No dedicated wiring or bus structure is required, as is the case with most conventional technologies. Also, as far as any local device or the host device is concerned, communications between the two appears to take place directly in accordance with the SCSI protocol.

FIG. 5 shows system 500 that controls communications between a host SCSI bus, that can be either a single-ended host SCSI bus 540 or a differential host SCSI bus 550, and a local SCSI bus 580. System 500 includes a Corona device 510, which is described in greater detail below with reference to FIG. 6, host SCSI bus interface drivers (520 and 530, respectively), and a local SCSI bus interface driver 560. Logic interface driver chips 520, 530 and 560 drive and receive communications on the SCSI buses and are well known in the prior art.

Referring now to FIGS. 5 and 6, Corona 510 handles direct SCSI operations and the controller 570 provides additional control and support. Internally, Corona 510 is divided into several basic sections. Each section is responsible for a different part of the system operation. The three basic sections are the controller interface 610, the arbitration logic 630 and the data path logic 620. The controller interface 610 provides a way to pass needed information between the controller 570 and Corona 510. The arbitration logic 630 processes the SCSI arbitration operations. The data path logic 620 controls the transfer of data between the host (540 or 550) and the local 580 SCSI buses. Corona 510 also includes a host SCSI bus interface 650, which interfaces with and controls host interface drivers 520 and 530. Corona 510 also includes a local SCSI bus interface 660, which interfaces with and controls local SCSI bus interface driver 560.

The controller function is to provide LUN to device map information during Select arbitrations, device to LUN map information during Reselect arbitrations, to monitor host device and local device messages for data mode messages, and to use the information from any current or previous data mode messages to configure the data path for the correct mode of operation. When an invalid or failed LUN is requested, the controller 570 provides the proper SCSI information for the host computer 102 to report the error and prevent the system from hanging. The controller 570 can be implemented using any known controller or microprocessor, such as an 8051.

I. Corona Arbitration Logic

Figure 7A:
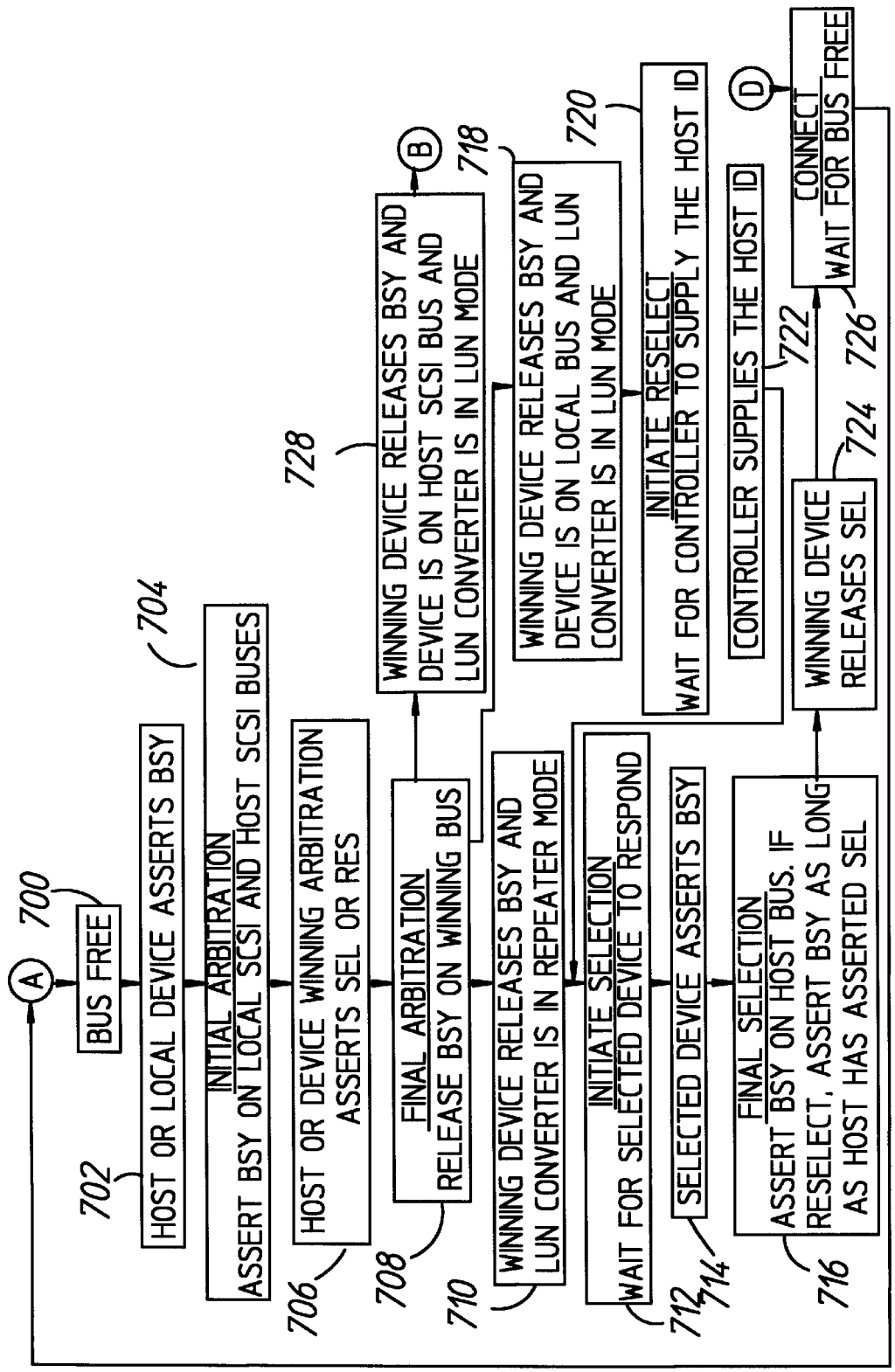

Corona's arbitration logic 630 handles the arbitration operations of the SCSI bus. The arbitration logic consists of an arbitration state machine 634 and a data line transfer logic 632. The arbitration state machine 634 is the same for both repeater and LUN mode operations. Extra states are added for the LUN mode as needed. The state machine 634 controls the BSY, SEL, and data signals on the local 580 and host (540 or 550) buses. FIGS. 7A–C show a basic flowchart for the state machine 634.

In the repeater mode, the arbitration logic 630 transfers the data lines between the local 580 and host (540 or 550) buses for the first part of the arbitration cycle and supplies the winning and selected device addresses during the second part of the arbitration cycle. In the LUN mode, the arbitration logic 630 converts the local devices' bus arbitration addresses to the correct host bus SCSI ID. If the host bus (540 or 550) is winning the arbitration cycle, the data transfer logic 632 asserts ID 7 on the local bus 580 to prevent any of the local devices from mistakenly thinking it has won the arbitration cycle. Corona 510 supports more than one SCSI ID on the host bus (540 or 550) in the LUN mode. This allows different local device types to be mapped to different host SCSI addresses, because some host computers 102 assume all devices at the same SCSI ID are of the same type (i.e., all are disk drives, or all are printers, etc.).

The arbitration state machine 634 divides the arbitration cycle into many states. There is at least one state and sometimes more for every SCSI defined transition point in the arbitration cycle. The extra states are used when the SCSI specifications require a minimum period of time to pass before proceeding. Using the arbitration state machine 634 and knowledge of what is occurring on the SCSI bus during these states, Corona 510 is able to predict ahead of time and control the state of SEL and BSY lines to avoid the logic generated glitches of the prior art.

A. Arbitration Glitch

During the initial arbitration phase, one SCSI device may start the arbitration only to find a device with a higher address also wants to arbitrate. At that time, the initial device may decide to quit arbitrating. In prior art systems, the repeater and LUN state machines only detected this when the initial BSY signal would quit being asserted. The state machines reversed the BSY transfer logic to drive the line in the other direction after BSY is released. During this turn-around time, the BSY signal is not asserted on one of the SCSI buses resulting in the "turnaround glitch". Corona 510 solves this problem by using a single state machine to monitor and control all BSY, SEL and data transfer operations.

The arbitration state machine 634 asserts BSY on both the local 580 and host (540 or 550) SCSI buses at the start of arbitration. The arbitration state machine 634 also monitors the data and SEL lines to determine if any device is actually arbitrating and when the next arbitration state starts. The data and SEL lines are used to determine which bus (local 580 or host 540 or 550) won arbitration by the arbitration state machine 634. Once the winning device is determined, Corona 510 quits asserting the BSY signal on the bus of the winning device and keeps it asserted on the bus of the losing device. This avoids the turnaround glitch.

B. Reselect Glitch

Another turnaround glitch is generated in prior art systems during the Reselect operation. During Reselect operations, the BSY signal is asserted by the winning device on the host bus. When the local device detects the BSY signal has been asserted, it asserts BSY and then releases SEL. When SEL is released, the host device releases BSY. In prior art systems, the state machine logic waits for the host device to release BSY before the state machine asserts it again. In the present invention, Corona 510 avoids this glitch by looking at the system as a whole. When the host computer 102 asserts BSY, Corona 510 knows the local device will be asserting BSY so Corona 510 asserts BSY on the host bus (540 or 550) as well as on the local bus 580 prior to the local device releasing SEL. Once the local device quits asserting SEL, Corona 510 stops asserting BSY on the local bus 580. Again, this prevents the turnaround glitch of the prior art systems.

For LUN mode arbitrations, Corona's arbitration state machine 634 has two modes of operations. The first is the Select mode and the second is the Reselect mode. If the host bus (540 or 550) wins the arbitration, the arbitration state machine 634 enters the Select mode. If the local bus 580 wins, the arbitration state machine 634 enters the Reselect mode. Both modes start after the initial arbitration sequence is completed and a winning device is determined.

C. Select Mode

In the Select mode, the arbitration state machine 634 waits for either some other device to respond to the host bus (540 or 550) or for one of Corona's SCSI ID's to be requested. If one of Corona's ID's is requested, the arbitration state machine 634 will progress through a series of states to complete the arbitration Select cycle with the host bus (540 or 550) while keeping the local bus 580 in a pending arbitration state by keeping BSY and SEL asserted on the local bus. After completing arbitration on the host bus (540 or 550), the arbitration state machine 634 waits for the controller 570 to read the Identify Message from the host computer 102 and to determine which local device is to be Selected.

Once the controller 570 provides this information, the arbitration state machine 634 steps through a series of states to complete arbitration with the local device and proceeds with the information transfer phases. Anytime during this process, if the controller 570 detects an error, it can abort the process and return an error condition to the host computer 102. If the arbitration state machine 634 detects some other host device responding to the Select operation while waiting for Corona's SCSI ID, the arbitration state machine 634 executes a pseudo arbitration cycle without any actual device addresses on the local bus 580 to make sure all local devices are through the arbitration sequence.

D. Reselect Mode

If the arbitration state machine 634 detects that a Reselect cycle is being performed by a local device in the LUN mode, the arbitration state machine 634 informs the controller 570 and waits for the controller 570 to supply the host ID. The arbitration state machine 634 then allows the local device to complete the arbitration cycle as described above for the repeater Reselect cycle of the prior art.

II. Corona Data Path Logic

The SCSI specifications allow the host and local devices to agree on different modes and speeds of communication. For a repeater, this is not a problem because all host and local SCSI devices always agree by the nature of the bus operations. For the LUN mode of prior art systems, this is a problem. Per the ANSI specification, the host only has to negotiate with a SCSI ID once after which all LUN's at that address are to respond with the same communication mode. With a LUN converter, this approach does not work because the communication is not done with the LUN converter but rather with one of the "LUN's" at the SCSI address. None of the other devices change their communication modes.

To solve this problem in the present invention, Corona 510 monitors the communication mode agreements between the host and the local devices. When a local device is Selected, the LUN converter sets up the data path logic 620 to match the different local 580 and host (540 or 550) bus communication modes and provides data mode conversion if the local and host data modes are not the same. The data path logic 620 converts from any data mode to any data mode using a combination of FIFO's (not shown), state machines (624 and 626), signal pass through and hold logic (622).

A. Data Monitoring

The present invention uses the controller 510 to monitor data communication messages. During a message phase, the controller 570 reads each byte being transferred and if it finds the data mode communication message, the controller 570 records what mode is being agreed to. The controller 570 uses the information to select the proper communication modes for the data path logic 620. Every time any local and host devices complete arbitration, the controller 570 reconfigures the data path logic 620 to match the communication mode each device will use. The data path control logic 620 can force the REQ state machine 624 to extend the REQ pulse until the controller 570 has had time to examine the data. With the REQ pulse extended, Corona can limit the SCSI bus transfer speed to the maximum speed of the slowest device on the bus (i.e., either the local device, host device or the controller 570).

B. Data Mode Translation

When Corona 510 detects the SCSI data transfer phase, Corona 510 transfers data using the conversion information supplied by the controller 570. The possible modes are asynchronous and synchronous. For the synchronous modes, there are different possible speeds and offsets which can be agreed to. This applies to all devices on both the local 580 and host (540 or 550) buses. To handle the matrix of communication modes, the data path logic 620 uses a master control state machine 622 which interfaces with the controller 570 and two data transfer state machines (REQ state machine 624 and ACK state machine 626). The master control state machine 622 allows the controller 570 to monitor communications for synchronous data transfer request messages. The master control state machine also allows the controller 570 to modify the information being transferred. The two data transfer machines (624 and 626) control the operation of the REQ and ACK lines (not shown). There is one machine and FIFO (not shown) for each line.

When both the local and host devices are in the asynchronous to asynchronous mode, data is passed straight through Corona 510 with the REQ 624 and ACK 626 state machines just buffering the REQ and ACK lines. If either bus is in the synchronous mode, all data is clocked into the FIFO's. In this mode, if the state machine (624 or 626) is connected to a synchronous SCSI device, it clocks data out of its FIFO, waits the correct amount of time, asserts its REQ or ACK line (depending on which state machine), waits some more and then releases the line. At the end of the cycle, the state machine (624 or 626) waits for more data in the FIFO before starting the next cycle.

When the state machine (624 or 626) is communicating with an asynchronous SCSI device in a synchronous to asynchronous mode, the state machine (624 or 626) starts by clocking data out of the FIFO and waiting the correct amount of time before asserting REQ or ACK as appropriate. Instead of just waiting for a short time and then releasing the line as with a synchronous device, the state machine (624 or 626) also waits for the device to respond per the asynchronous SCSI specifications (i.e., with a host device, the REQ state machine 624 waits for the host to assert ACK before the REQ state machine 624 releases REQ. It also waits for the host to release ACK before checking for more data in the FIFO. With a local device, the ACK state machine 626 waits for the local device to release REQ before releasing ACK.)

When the controller 570 is communicating with either a host or a local device, the REQ 624 and ACK 626 state machines disable their outputs and FIFO's allowing the controller 570 to put its data on the local 580 and host (540 or 550) SCSI buses and to handshake the REQ and ACK lines as needed. This allows the controller 570 to read and write either bus without interference.

III. Operating Sequence

Having described the structure of the LUN converter of the present invention, the typical communication sequences will now be described in greater detail with reference to FIGS. 7A–7C. These sequences show how the system works but do not define or limit its operations.

A. Repeater Mode

Starting at a bus free condition 700, as specified in the ANSI specifications for SCSI, a device (local or host) asserts BSY and its ID 702. Corona's arbitration logic 630 asserts BSY on both local 580 and host (540 or 550) buses and waits for a winning device 704. There are no modifications of the values on the local data bus 580. All data lines are passed directly between both the local 580 and host (540 or 550) buses. When a device wins the arbitration 706, Corona 510 releases BSY on the winning device's bus 708 and waits for a selected device to respond. If both the winning device and the selected device are on the host bus (540 or 550), Corona 510 echos the state of BSY to the local bus 580 and waits for a bus free condition again 700.

If either the winning or selected device is a local device, Corona 510 completes the arbitration sequence 708 and enters the information transfer phase. In the repeater mode 710, no data conversions are needed and data is passed through Corona 510 without changes. This is true for all information transfer phases. Phases, phase sequence, and the end of communications are all controlled by the local device at this point in the SCSI communication sequence. Corona passes all information without change until a bus free condition is detected. Once the communications are completed, the local device and the host enter the bus free state 700. When Corona 510 detects the bus free state 700, it clears its state machines out and returns to the arbitration starting point, waiting for the next occurrence of arbitration.

B. LUN Mode

In the LUN mode, the arbitration logic 630 follows slightly different sequences for Select and Reselect operations as defined by ANSI. From the bus free condition 700, the initial part of the arbitration sequence is the same for both Select and Reselect. When Corona 510 detects the start of an arbitration sequence 702, it asserts BSY on both buses 704 and waits for a winning device 706. In the LUN mode, the data lines are not passed directly between the local 580 and host (540 or 550) buses as in the repeater mode. If any local device is trying to arbitrate, Corona 510 asserts Corona's SCSI ID in place of the local devices ID on the host bus (540 or 550). If a device on the host bus (540 or 550) with a higher SCSI ID than Corona is also arbitrating, Corona 510 asserts ID 7 on the local bus 580 to keep the local devices from thinking one of them won arbitration. Once a device wins arbitration on either bus, Corona 510 continues with Select and Reselect operations. If the winning device is on the host bus (540 or 550) 728, Corona 510 proceeds with a Select operation. If the winning device is on the local bus (580) 718, Corona 510 proceeds with a Reselect operation.

1) Select

In the LUN mode, once Corona 510 has decided to perform a select operation, Corona 510 keeps both BSY and SEL asserted on the local bus 580 while waiting to see if it is selected on the host bus (540 or 550). If Corona 510 detects another device on the host bus (540 or 550) responding to the Select, Corona 510 assumes it 510 was not Selected 742 and releases the BSY on the local bus (580) 744. The arbitration state machine 634 proceeds to clock the local bus 580 through an arbitration cycle 746, 748 without SCSI address information and then stops at the information transfer state waiting for the host bus (540 or 550) to be free 726.

If Corona 510 detects its SCSI address on the host bus (540 or 550) 728 & 730, the arbitration state machine 634 completes arbitration with the host device and informs the controller 570 of a completed Select arbitration 732. The controller 570 communicates through Corona with the host device and gets the SCSI Identify Message. The controller 570 tracts the LUN number from the Identify Message and converts it to a local SCSI bus address. The controller 570 returns this information to Corona (510) 734 which then arbitrates with the local devices to complete the arbitration sequence 736. Once Corona is done arbitrating with the local devices, the controller 570 passes the Identify Message to the Selected local device after clearing the LUN number from the message. After the identify message, Corona allows the local and host devices to communicate with each other (738). Corona's arbitration state machine 634 waits for bus free 726 to return to the start of arbitration.

When the controller 570 reads the Identify Message from the host for a non-existent local LUN or if the SCSI bus (540 or 550) times out trying to select the local device for the controller 570, the controller 570 stops the local arbitration sequence and informs the host device of the arbitration failure per the SCSI specifications for failed LUN's. At this point, the controller 570 also checks with the host device for commands which must be responded to even in failed arbitration conditions. If the controller 570 detects one of these commands, it processes the command for the host. After the error conditions and error commands are processed, Corona 510 aborts the arbitration sequence and goes back to the bus free condition 700.

2) Reselect

When Corona 510 detects a LUN Reselect, the arbitration logic 630 informs the controller 570 and waits for the correct host device to Reselect 718. The controller 570 Reselects the last host device which used the local device 720. When the controller 570 supplies this information to Corona (510) 722, Corona 510 proceeds with the arbitration sequence using the host ID from the controller and the local SCSI ID of Corona. Once the host device responds to the Reselect 712, 714, the controller 570 reads the SCSI Identify Message from the local device and combines it with the LUN number for the local device. The controller 570 passes the modified Identify Message to the host device. After the identify message is processed, Corona 510 allows the local and host devices to communicate with each other (716, 724). Corona's arbitration state machine 634 waits for the bus free condition to return to the start of arbitration.

In the LUN mode, Corona 510 translates between different SCSI data modes. The data modes used are determined by what mode the local device has agreed to and what mode the host device has agreed to. The controller 570 keeps track of which mode every device on both buses are using. The controller 570 provides this information to Corona 510 for every LUN connection. The controller 570 also monitors the SCSI buses for any new data rate negotiations. That is whether the local and host devices have agreed to communicate in asynchronous, synchronous (200 nsec.) or fast synchronous (100 nsec.) mode. If the data rate is renegotiated, the controller 570 reconfigures Corona's data mode to the new rate. Otherwise, the controller 570 lets the communications proceed using the previously agreed to data rates. Once the communications are complete and the local and host devices return to the bus free state 700, Corona 510 resets its arbitration logic 630 and waits for the start of the next arbitration cycle 702.

Figure 8:
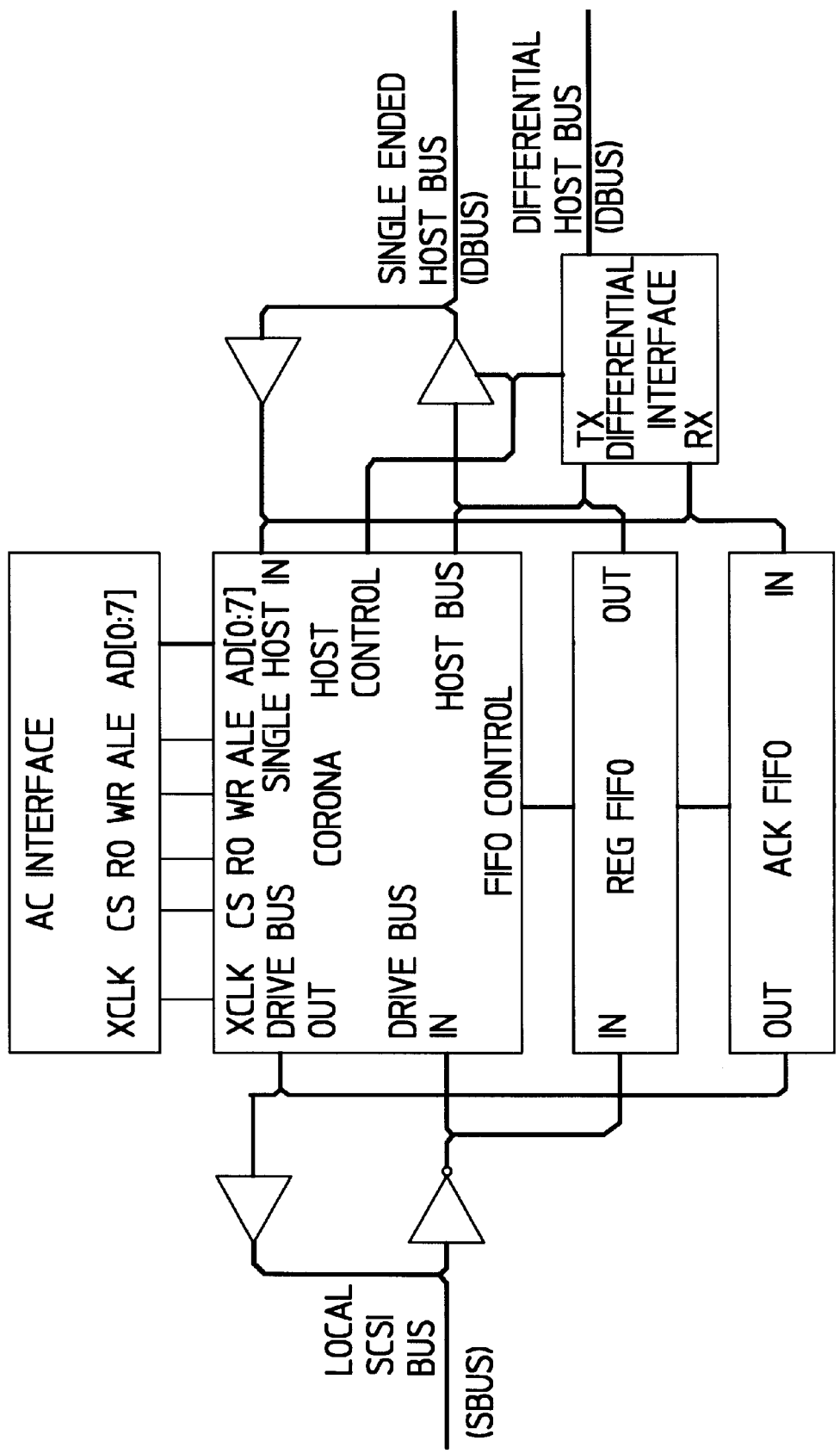
FIG. 8 shows a preferred embodiment of the present invention as described in FIGS. 5 and 6.

FIG. 8 shows one preferred embodiment of the present invention as described above with reference to FIGS. 5 and 6.

The foregoing description of the present invention has been presented for purposes of illustration and description. It is not intended to be exhaustive or to limit the invention to the precise form disclosed, and other modifications and variations may be possible in light of the above teachings. For example, using any number and combination of host SCSI bus ports, using a 16 or 32 bit SCSI bus in place of the 8 bit bus, combining this logic with other logic in a new custom SCSI interface circuit, or working with data rates faster than specified in ANSI's Fast SCSI specification. It should be noted that the present invention could readily be applied to systems utilizing data rates other than those specified in ANSI's SCSI specifications. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for allowing more than eight devices to be effectively connected to a single narrow host SCSI bus, the system adapted to enable communications to occur between a host device having a first SCSI port, and a plurality of target devices, each having a SCSI port, the system comprising:

a host SCSI bus connected to the first SCSI port of the host device, the host device having a first host bus SCSI ID number used to identify the host device on said host SCSI bus;

a local SCSI bus connected to the SCSI ports of the plurality of target devices;

Corona means having a second SCSI port and a third SCSI port, for transferring the communications between the host device and one of the plurality of target devices selected by the host device, said Corona means connected to said host SCSI bus at said second SCSI port and to said local SCSI bus at said third SCSI port, said Corona means having a second host bus SCSI ID number used to identify said Corona means on said host SCSI bus and a first local SCSI ID number used to identify said Corona means on said local SCSI bus, and for converting a SCSI logical unit number received from the host device to a second local bus SCSI ID number, said second local bus SCSI ID number identifying said selected target device on said local SCSI bus to establish communications between the host device and said selected target device, wherein said Corona means further comprises data path logic, connected between said controller and said host SCSI bus and said local SCSI bus, for converting communications between said host SCSI bus and said local SCSI bus into appropriate data mode; and a controller connected to said Corona means for supporting and controlling said Corona means during SCSI operations between said host SCSI bus and said local SCSI bus.

2. The system according to claim 1, wherein said Corona means further comprises:

arbitration logic connected to said host SCSI bus at said second SCSI port and to said local SCSI bus at said third SCSI port for handling SCSI arbitration operations between said host SCSI bus and said local SCSI bus.

3. The system according to claim 1, wherein said data path logic further comprises:

a request state machine for transferring data from a local SCSI device to said host SCSI device and for generating a proper form of REQ on said host SCSI bus;

an acknowledge state machine for the transfer of data from said host SCSI device to said local SCSI device and for generating a proper form of ACK on said local SCSI bus; and data path control logic for coordinating and controlling both the request and acknowledge state machines for proper data transfers.

4. The system according to claim 2, wherein said arbitration logic further comprises:

an arbitration state machine for controlling busy and select signals on the host SCSI bus and the local SCSI bus.

5. The system according to claim 2, wherein said arbitration logic further comprises:

a data line transfer logic for transferring data lines between the host SCSI bus and the local SCSI bus.

6. The system according to claim 2, wherein said arbitration logic further comprises:

an arbitration state machine for controlling the busy and select signals on the host SCSI bus and the local SCSI bus; and a data line transfer logic for transferring data lines between the host SCSI bus and the local SCSI bus.

7. A system for allowing more than eight devices to be effectively connected to a single narrow host SCSI bus, the system adapted to enable communications to occur between a host device having a first SCSI port, and a plurality of target devices, each having a SCSI port, the system comprising:

a host SCSI bus connected to the first SCSI port of the host device, the host device having a first host bus SCSI ID number used to identify the host device on said host SCSI bus;

a local SCSI bus connected to the SCSI ports of the plurality of target devices;

Corona means having a second SCSI port and a third SCSI port, for transferring the communications between the host device and one of the plurality of target devices selected by the host device, said Corona means connected to said host SCSI bus at said second SCSI port and to said local SCSI bus at said third SCSI port, said Corona means having a second host bus SCSI ID number used to identify said Corona means on said host SCSI bus and a first local SCSI ID number used to identify said Corona means on said local SCSI bus, and for converting a SCSI logical unit number received from the host device to a second local bus SCSI ID number, said second local bus SCSI ID number identifying said selected target device on said local SCSI bus to establish communications between the host device and said selected target device, wherein said Corona means further comprises arbitration logic, connected to said host SCSI bus at said second SCSI port and to said local SCSI bus at said third SCSI port, for handling arbitration operations between said host SCSI bus and said local SCSI bus, and data path logic, connected between said controller and said host SCSI bus and said local SCSI bus, for converting communications between said host SCSI bus and said local SCSI bus into the appropriate data mode; and a controller connected to said Corona means for supporting and controlling said Corona means during SCSI operations between said host SCSI bus and said local SCSI bus.

8. The system according to claim 1, wherein said second SCSI port of said Corona means has host single-ended and differential SCSI ports to enable said Corona means to be connected to and support either a single-ended or a differential host SCSI bus.

9. A system for allowing more than eight devices to be effectively connected to a single narrow host SCSI bus, the system adapted to enable communications to occur between a host device having a first SCSI port, and a plurality of target devices, each having a SCSI port, the system comprising:

a host SCSI bus connected to the first SCSI port of the host device, the host device having a first host bus SCSI ID number used to identify the host device on said host SCSI bus;

a local SCSI bus connected to the SCSI ports of the plurality of target devices;

Corona means having a second SCSI port and a third SCSI port, for transferring the communications between the host device and one of the plurality of target devices selected by the host device, said Corona means connected to said host SCSI bus at said second SCSI port and to said local SCSI bus at said third SCSI port, said Corona means having a second host bus SCSI ID number used to identify said Corona means on said host SCSI bus and a first local SCSI ID number used to identify said Corona means on said local SCSI bus, and for converting a SCSI logical unit number received from the host device to a second local bus SCSI ID number, said second local bus SCSI ID number identifying said selected target device on said local SCSI bus to establish communications between the host device and said selected target device, wherein said second SCSI port of said Corona means has host single-ended and differential SCSI ports to enable said Corona means to be connected to and support either a single-ended or a differential host SCSI bus; and a controller connected to said Corona means for supporting and controlling said Corona means during SCSI operations between said host SCSI bus and said local SCSI bus, wherein said controller controls host SCSI bus type selection by said Corona means.

10. The system according to claim 1, wherein said controller performs LUN mapping between said host SCSI bus and said local SCSI bus.

11. A system for allowing more than eight devices to be effectively connected to a single narrow host SCSI bus, the system adapted to enable communications to occur between a host device having a first SCSI port, and a plurality of target devices, each having a SCSI port, the system comprising:

a host SCSI bus connected to the first SCSI port of the host device, the host device having a first host bus SCSI ID number used to identify the host device on said host SCSI bus;

a local SCSI bus connected to the SCSI ports of the plurality of target devices;

Corona means having a second SCSI port and a third SCSI port, for transferring the communications between the host device and one of the plurality of target devices selected by the host device, said Corona means connected to said host SCSI bus at said second SCSI port and to said local SCSI bus at said third SCSI port, said Corona means having a second host bus SCSI ID number used to identify said Corona means on said host SCSI bus and a first local SCSI ID number used to identify said Corona means on said local SCSI bus, and for converting a SCSI logical unit number received from the host device to a second local bus SCSI ID number, said second local bus SCSI ID number identifying said selected target device on said local SCSI bus to establish communications between the host device and said selected target device; and a controller connected to said Corona means for supporting and controlling said Corona means during SCSI operations between said host SCSI bus and said local SCSI bus, wherein said controller detects and responds to SCSI error conditions on either said host SCSI bus or on said local SCSI bus.

12. The system according to claim 1, wherein said system is capable of operating in either LUN or repeater mode.

13. The system according to claim 12, wherein said controller controls whether the operation mode of said system is LUN or repeater.

14. A system for allowing more than eight devices to be effectively connected to a single narrow host SCSI bus, the system adapted to enable communications to occur between a host device having a first SCSI port, and a plurality of target devices, each having a SCSI port, the system comprising:

a host SCSI bus connected to the first SCSI port of the host device, the host device having a first host bus SCSI ID number used to identify the host device on said host SCSI bus;

a local SCSI bus connected to the SCSI ports of the plurality of target devices;

Corona means having a second SCSI port and a third SCSI port, for transferring the communications between the host device and one of the plurality of target devices selected by the host device, said Corona means connected to said host SCSI bus at said second SCSI port and to said local SCSI bus at said third SCSI port, said Corona means having a second host bus SCSI ID number used to identify said Corona means on said host SCSI bus and a first local SCSI ID number used to identify said Corona means on said local SCSI bus, and for converting a SCSI logical unit number received from the host device to a second local bus SCSI ID number, said second local bus SCSI ID number identifying said selected target device on said local SCSI bus to establish communications between the host device and said selected target device; and a controller connected to said Corona means for supporting and controlling said Corona means during SCSI operations between said host SCSI bus and said local SCSI bus, wherein said system is capable of transferring data between said host SCSI bus and said local SCSI bus in either asynchronous, synchronous or fast synchronous mode.

15. The system according to claim 14, wherein said controller performs data mode conversion control during data transfers between said host SCSI bus and said local SCSI bus.

16. A method for allowing more than eight units on a host SCSI bus to transfer communications between a host device having a first SCSI port and a selected on of a plurality of target devices, each having a SCSI port, the host device connected to the host SCSI bus at the first SCSI port and having a first host bus SCSI ID number used to identify the host device on the host SCSI bus, the system having a Corona device having a second SCSI port and a third SCSI port, the Corona device connected to the host SCSI bus at the second SCSI port and to a local SCSI bus at the third SCSI port, and the plurality of target devices connected to a local SCSI bus, the method comprising:

a) selecting the host SCSI bus type;

b) designating a second or multiple host bus SCSI IDs identifying the Corona device on the host SCSI bus;

c) checking to determine whether an operation will be in repeater or LUN operation mode;

d) if the Corona device is not already configured to a desired operation mode, reconfiguring the Corona device for a desired repeater or LUN operation mode;

e) performing a first select cycle to enable the host device to select the Corona device at said designated second host bus SCSI ID number;

f) converting a SCSI logical unit number received from the host device on the host SCSI bus to a corresponding first local SCSI ID number associated with the selected target device on the local SCSI bus;

g) checking to determine an agreed upon data transfer mode;

h) if the Corona device is not already configured to the agreed upon data transfer mode, reconfiguring the Corona device to the agreed upon data transfer mode;

i) performing a second select cycle to enable the Corona device to select the selected target device at said first local SCSI ID number; and j) connecting the host device and the selected target device through the Corona device to establish communications between the host device and the selected target device.

17. The method according to claim 16, further comprising the steps of:

a) detecting error condition on either said host SCSI bus or said local SCSI bus; and b) reporting any of said error conditions on either said host SCSI bus or said local SCSI bus to said host device.

18. The method according to claim 16, further comprising the steps of:

a) designating a second local bus SCSI ID number identifying the Corona device on the local SCSI bus;

b) performing a first reselect cycle to enable the selected target device to select the Corona device at said designated local bus SCSI ID number;

c) converting said first local SCSI ID number associated with the selected target device on the local SCSI bus to said SCSI logical unit number;

d) checking to determine the agreed to data transfer mode;

e) if the Corona device is not already configured to the agreed to data transfer mode, reconfiguring the Corona device to the agreed to data transfer mode;

f) performing a second reselect cycle to enable the Corona device to select the host device at the first host SCSI ID number; and g) connecting the host device and the selected target device through the Corona device to permit communications to take place between the host device and the selected target device.

19. The method according to claim 18, further comprising the steps of:

a) detecting error condition on either said host SCSI bus or said local SCSI bus; and b) reporting any of said error conditions on either said host SCSI bus or said local SCSI bus to said host device.

* * * * *